United States Patent
Przybyla

(10) Patent No.: US 12,455,373 B2
(45) Date of Patent: Oct. 28, 2025

(54) DYNAMIC ADAPTATION OF ULTRASONIC DETECTION PARAMETERS BASED ON IMAGE CLASSIFICATION

(71) Applicant: InvenSense, Inc., San Jose, CA (US)

(72) Inventor: Richard Przybyla, Piedmont, CA (US)

(73) Assignee: InvenSense, Inc., San Jose, CA (US)

( * ) Notice: Subject to any disclaimer, the term of this patent is extended or adjusted under 35 U.S.C. 154(b) by 42 days.

(21) Appl. No.: 18/619,939

(22) Filed: Mar. 28, 2024

(65) Prior Publication Data

US 2024/0385316 A1 Nov. 21, 2024

Related U.S. Application Data

(60) Provisional application No. 63/502,496, filed on May 16, 2023.

(51) Int. Cl.
*G01S 15/04* (2006.01)
*G01S 15/42* (2006.01)
*G06V 10/764* (2022.01)

(52) U.S. Cl.
CPC ............. *G01S 15/04* (2013.01); *G01S 15/42* (2013.01); *G06V 10/764* (2022.01); *G06V 2201/07* (2022.01)

(58) Field of Classification Search
CPC ....... G01S 15/04; G01S 15/42; G06V 10/764; G06V 2201/07

USPC .......................................................... 367/93
See application file for complete search history.

(56) References Cited

U.S. PATENT DOCUMENTS

| | | | |
|---|---|---|---|
| 9,626,841 B2* | 4/2017 | Fadell | G08B 19/005 |
| 10,688,927 B2* | 6/2020 | Lee | G01S 13/00 |
| 10,733,409 B2* | 8/2020 | D'Souza | G06V 40/1306 |
| 10,992,905 B1* | 4/2021 | Therkelsen | H04N 7/147 |
| 2009/0303100 A1* | 12/2009 | Zemany | G01S 13/56 |
| | | | 342/28 |
| 2021/0239831 A1* | 8/2021 | Shin | G01S 13/886 |
| 2022/0057498 A1* | 2/2022 | Duval | G01S 15/42 |
| 2023/0083504 A1* | 3/2023 | Burns | G06T 7/70 |
| | | | 705/4 |

* cited by examiner

*Primary Examiner* — Kerri L McNally
(74) *Attorney, Agent, or Firm* — Van Hoven PC; Joshua Van Hoven; Stefan D. Osterbur

(57) ABSTRACT

An object detection system includes an ultrasonic sensor and an image sensor. The ultrasonic sensor transmits an ultrasonic signal into an environment of interest and makes an initial determination regarding a potential object in the environment of interest based on received reflections of the ultrasonic signal. Based on that initial determination, the image sensor and associated processing circuitry wake up and capture one or more images of the object within the environment of interest. Those images are analyzed such as by a classifier to determine the object status, which is then compared to the object status as determined by the ultrasonic sensor. Detection parameters of the ultrasonic sensor are updated if the object status as determined ultrasonic sensor does not match the determination of the imaging system.

22 Claims, 10 Drawing Sheets

DYNAMIC ADAPTATION OF ULTRASONIC DETECTION PARAMETERS BASED ON IMAGE CLASSIFICATION

CROSS-REFERENCE TO RELATED APPLICATION

This application claims priority to U.S. Provisional Patent Application No. 63/502,496, filed May 16, 2023, and entitled "ULTRASONIC LOW POWER WAKEUP WITH CAMERA CLASSIFICATION," which is incorporated by reference herein in its entirety for all purposes.

BACKGROUND

Object detection systems are integrated into numerous end use devices such as security systems, door locks, computers, smart phones, tablet devices, vehicles, and the like. In many such applications, the device that includes the object detection system is not connected to a continuous power supply such as an electrical outlet, but instead is powered by a battery or other intermittent power source. In some applications, the object detection system is only needed occasionally or intermittently, such that continuously or periodically powering certain components of the object detection system such as an image capture system (e.g., an image, infrared or time-of-flight camera) and associated processing circuitry results in substantial unnecessary power consumption.

Ultrasonic sensors such as a piezoelectric micromachined ultrasonic transducer ("PMUT") sensor transmit an ultrasound signal or wave into an environment of interest and measure reflected signals that are received over time, with the timing and magnitude of the reflected or echo signal corresponding to the distance to an object of interest and the characteristics of the object causing the reflection. The ultrasound signals can be retransmitted over a period of time and in a predetermined timing pattern as is useful to capture information of interest, such as movement of objects which can be extracted from changing reflections over time. This information can in turn be used to make determinations about the objects, such as a type of object or a characterization of the object's movement or status. Because ultrasonic sensors are employed in a wide variety of applications and environments, it is possible that the determinations about the objects of interest may be incorrect due to the application or environment, for example, based on foreign objects occluding the transmission path or other waves or signals interfering with reflections of the transmitted ultrasonic signal.

SUMMARY

In at least some examples, a method of dynamically updating detection parameters for an ultrasonic sensor of an object detection system is provided. The method includes transmitting an ultrasonic signal from the ultrasonic sensor and receiving reflections of the transmitted ultrasonic signal at the ultrasonic sensor. The method also includes evaluating the reflections based on the detection parameters and determining, based on the evaluating, whether a triggering event has occurred. The method further includes reporting, when the triggering event has occurred, the triggering motion to processing circuitry of the object detection system. The method also includes waking, by the processing circuitry, an image capture system of the object detection system in response to the reporting of the triggering motion. The method also includes capturing, by the awakened image capture system, one or more images of an object, and classifying, by the processing circuitry, the one or more images. The method further includes determining, based on the classifying, whether the object satisfies one or more object detection criteria, and identifying an error in the determination that the triggering motion has occurred when the object does not satisfy the one or more object detection criteria. Additionally, the method includes adapting, by the processing circuitry when the error is identified, one or more of the detection parameters.

In at least some examples, an object detection system is provided comprising an ultrasonic sensor, an image capture device, and processing circuitry. The processing circuitry may be configured to dynamically update detection parameters for the ultrasonic sensor. More specifically, the processing circuitry may be configured to transmit, from the ultrasonic sensor, an ultrasonic signal, and to receive, at the ultrasonic sensor, reflections of the transmitted ultrasonic signal. The processing circuitry may also be configured to evaluate the reflections based on the detection parameters, and to determine, based on the evaluating, whether a triggering event has occurred. The processing circuitry may also be configured to report, when the triggering event has occurred, the triggering event to processing circuitry of the object detection system. The processing circuitry is also configured to wake, by the processing circuitry in response to the reporting of the triggering event, an image capture system of the object detection system. The processing circuitry may also be configured to capture, by the awakened image capture system, one or more images of an object, and to classify, by the processing circuitry, the one or more images. The processing circuitry may be further configured to determine, based on the classifying, whether the object satisfies one or more object detection criteria. Additionally, the proceeding circuitry may be configured to identify an error in the determination that the triggering event has occurred when the object does not satisfy the one or more object detection criteria, and to adapt, by the processing circuitry when the error is identified, one or more of the detection parameters.

In at least some examples, a non-transitory computer-readable medium has instructions stored thereon, that when executed by processing circuitry of an object detection system cause the processing circuitry to perform operations comprising transmitting, from an ultrasonic sensor, an ultrasonic signal, receiving, at the ultrasonic sensor, reflections of the transmitted ultrasonic signal, evaluating the reflections based on detection parameters, and determining, based on the evaluating, whether a triggering event has occurred. The operations may further comprise reporting that the triggering event has occurred, waking, in response to the reporting of the triggering event, an image capture system of the object detection system, capturing, by the awakened image capture system, one or more images of an object, and classifying the one or more images. The method may further comprise determining, based on the classifying, whether the object satisfies one or more object detection criteria, identifying an error in the determination that the triggering event has occurred when the object does not satisfy the one or more object detection criteria, and adapting, when the error is identified, one or more of the detection parameters.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
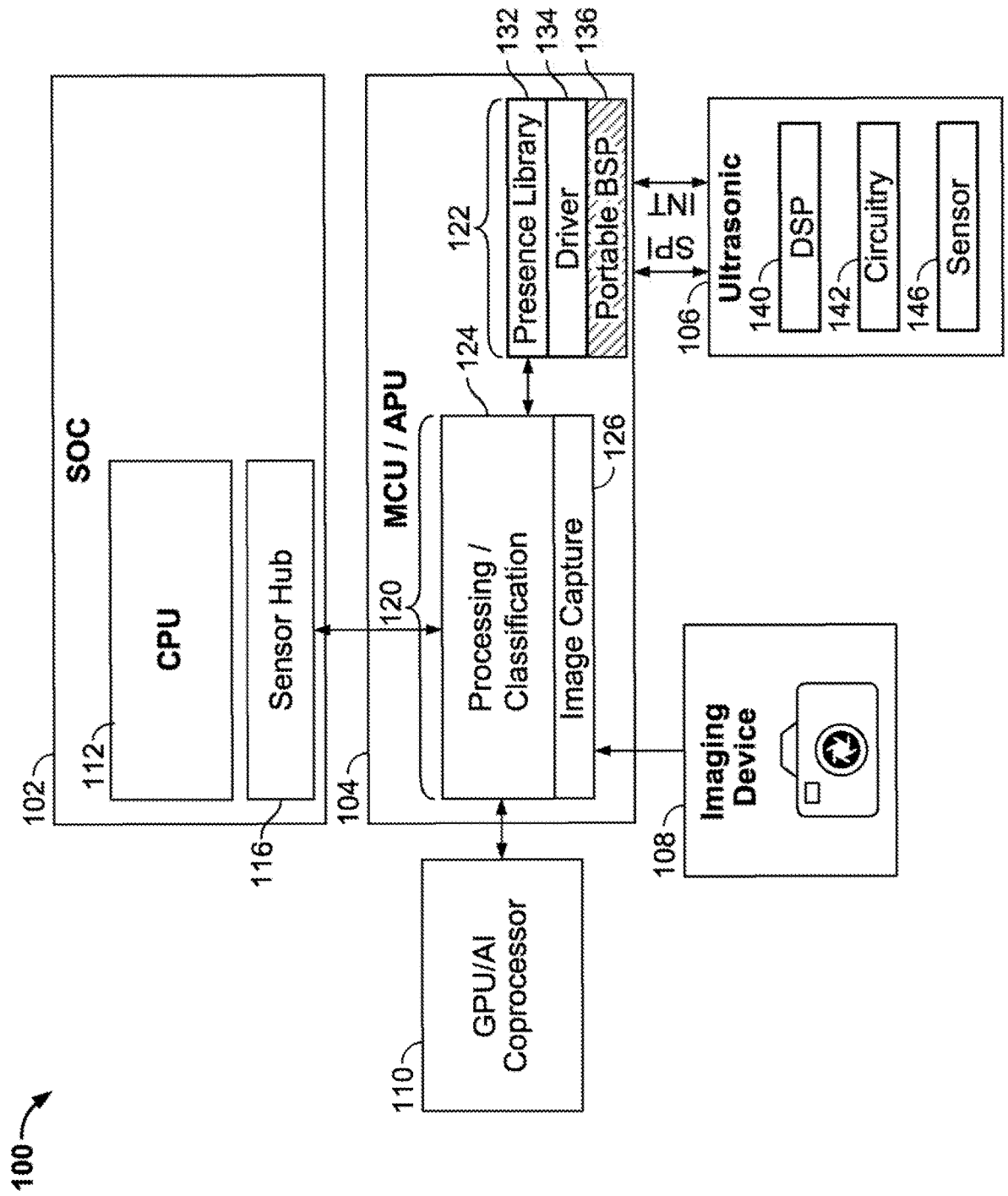
FIG. 1 depicts an illustrative object detection system including an ultrasonic sensor in accordance with an embodiment of the present disclosure.

An object detection system includes a sleep mode in which higher power consumption components such as an image capture system and associated processing circuitry are normally inactive to limit power usage and consumption. Lower power components are powered during the sleep mode, or are awakened relatively more often during the sleep mode, and perform an initial determination as to whether a triggering an event for waking other components of the system has occurred. In an exemplary embodiment, the image capture system includes a camera, processing circuitry such as a central processing unit ("CPU") and/or graphics processing unit ("GPU"), memory, user interfaces such as screens or microphones, and communications hardware for communicating such as via wireless or wired communication mediums.

The wake-up components of the object detection system may include relatively low power components such as an ultrasonic sensor (e.g., a PMUT sensor), processing circuitry (e.g., analog and/or digital filtering and transmit/receive circuits, an ASIC, a microprocessor, and/or a dedicated digital signal processor ("DSP")), and a low-power communication interface. Collectively, these components consume relatively little power and are active during at least portions of the sleep mode, for example, by waking up to operate the ultrasonic sensor on a regular or periodic basis. The ultrasonic sensor transmits an acoustic signal into an area of interest (e.g., in accordance with a predetermined transmission pattern or sequence) and monitors the reflections in accordance with one or more detection parameters (e.g., moving or cumulative thresholds, gains applied to transmit or receive signals, rate of change thresholds, hysteresis criteria, and the like) to determine whether a triggering event has occurred. For example, a triggering event may include a detection of an object of interest (e.g., movement of a person, a stationary person, opening of a door or window, etc.). Once the triggering event is detected, a message or interrupt is transmitted to other components such as the image capture system to allow those other components to wake up and perform more complex and power consuming operations.

The message or interrupt causes at least some of the other components of the object detection system to wake, such as a camera of an image capture system and associated processing circuitry. The camera captures one or more images within the region of interest to enable more complex processing within the region of interest, for example, based on a trained classifier that parses images to identify a movement, presence, lack of movement, lack of presence, and/or a movement profile for the object of interest. In some instances, the result of this classification will be confirming the expected state of the object of interest, for example, movement of a human, presence of a particular person, a particular sequence of movements of a human hand, opening or closing of doors or windows, pet movement, presence of packages, or presence of a container, cup or vessel. In other instances, the expected state of the object of interest will not be detected, in which case information about the result of the image capture and classification may be utilized to adjust the detection parameters of the ultrasonic sensor. In instances of false positives, the ultrasonic sensor may perform a wake up based on detection of an object of interest when in fact the object of interest was not in the expected state for detection as determined by the image capture system and related processing. In instances of false negatives, the ultrasonic sensor may not perform a wake up due to lack of detection of an object of interest when in fact the object of interest was in the expected triggering state (e.g., present or moving) for detection as determined by the image capture system and related processing.

The identification of a false positive or false negative may be utilized to adjust the detection parameters used by the ultrasonic sensor and associated processing circuitry in determining that a triggering motion for sending a wake-up signal has occurred. For example, in an example of an object detection system implemented at a building entry such as a door lock, wind may cause objects such as branches or leaves to occasionally move within the area of interest. As another example, within an interior environment climate control systems changing state (e.g., turning on or off) may cause perturbations that are interpreted by the ultrasonic sensor as movement, or a consistent air flow may result in a baseline signal level that overwhelms or interferes with certain received echo signals. Based on the feedback as a false positive or false negative, and other information about the false positive or false negative such as timing information or confidence values, or an estimated range to the object that was desired/not desired to be detected, the detection parameter(s) for the ultrasonic sensor may be adjusted.

One example of an adjustment of a detection parameter may be adjusting sense thresholds (e.g., magnitude, range of reflections where thresholds applied, and/or length of time for exceeding a threshold) that are compared to the received reflected signals. Another example of an adjustment of a detection parameter may be to adapt a transmit gain for the ultrasonic sensor to increase the amplitude of reflections received in response to the transmitted ultrasonic sensors. The transmit gain may also be modified in a pattern, for example, to transmit subsequent signals having different gains from an originally transmitted ultrasonic signal. As another example, a receive gain may be modified, for example, over a receive range where a false positive or false negative occurred. Types of adaptations to detection parameters may be combined, and additional adaptations such as monitoring a rate of change or implementing hysteresis over a sense range may be employed to update the detection parameters. Following the update of detection parameters, the wake-up and feedback process may be repeated to determine the effectiveness of adaptations and provide further fine-tuning of detection parameters for optimal wake-up (e.g., based on a desired responsiveness and/or tolerance for power consumption under particular conditions).

FIG. 1 depicts an illustrative object detection system 100 including an ultrasonic device 106 in accordance with an embodiment of the present disclosure. FIG. 1 will be described in the context of an artificial intelligence (AI) camera module system architecture, such as for a laptop or other computer. Merely by way of example, the object detection system 100 may be directed to determining whether/when a user approaches the laptop computer, such that a screen of the computer may be activated, or whether/when a user steps away from the laptop computer, such that the screen may be deactivated or put into a sleep mode. However, it will be understood that the present disclosure may be utilized with a variety of other object detection systems, such as televisions, AR/VR glasses or goggles, mobile devices, vehicles, door locks, security cameras, and the like. Moreover, in the context of the present disclosure, object detection and an object detection system will be understood to include a variety of operations with respect to some environment of interest, including the presence and/or absence of any suitable object or combination of objects, motion of any suitable object or combination of objections, pattern recognition with respect to objects and object types, or any other suitable operations or analysis based on monitoring of a physical space of interest via ultrasonic sensing in combination with other (e.g., image, time-of-flight, infrared, etc.) sensing techniques. Although particular components are depicted and described in FIG. 1, it will be understood that components may be added, removed, substituted, or modified in accordance with the present disclosure. For example, while the description of FIG. 1 is described in the context of subsystems of a computing system, depending on implementations some or all of the components may be split between multiple local and remote computing devices, such as respective computing devices, servers, remote sensors, and the like.

In an embodiment of the present disclosure, the object detection system 100 includes a system on a chip ("SOC") 102, motion control unit ("MCU")/application processing unit ("APU") 104, ultrasonic device 106, imaging device 108, and GPU/AI Coprocessor 110, each of which may include one or more sub-components. Although each of these components and sub-components may be depicted as a logically and/or physically separate unit in FIG. 1, it will be understood that functionality and/or components of one or more of the objection detection system 100 components may be combined with one or more other components or implemented in whole or in part in another component of the object detection system 100. As described herein, at least a low power portion of the object detection system (e.g., including ultrasonic device 106 and in some embodiments ultrasonic processing circuitry 122) may be operational and powered more frequently than other components, for example, to perform an initial evaluation of whether a triggering event has occurred.

Each of the components of the of the object detection system 100 may include processing circuitry and/or memory as useful to perform the operations and processing described herein. In the context of the present disclosure, processing circuitry includes any circuitry utilized for the generation, processing, analysis, and other handling of signals that directly or indirectly convey information, including but not limited to analog processing circuitry, discrete digital circuits, circuitry generated via hardware description language ("HDL"), application specific integrated circuits ("ASICs"), field programmable gate array ("FPGAs"), microprocessors, central processing units ("CPUs"), graphics processing units ("GPUs"), tensor processing units ("TPUs"), and digital signal processors ("DSPs"). Memory may include any suitable non-transitory computer readable medium for storing, updating, tracking, and providing access to information such as instructions and data, such as random access memory ("RAM"), dynamic RAM ("DRAM"), static RAM ("SRAM), read-only memory ("ROM"), programmable ROM ("PROM"), erasable programmable ROM ("EPROM"), electrically erasable programmable ROM ("EEPROM"), flash memory, cache memory, virtual memory, and register memory.

In some embodiments, an ultrasonic device 106 can include an ultrasonic sensor 146, ultrasonic processing circuitry 142, and a DSP 140. The ultrasonic processing circuitry 142 includes circuitry such as amplifiers, filters, drivers, and the like for controlling and processing the sending and receiving of ultrasonic signals by ultrasonic sensor 146. DSP 140 provides digital processing for the generation and reception of ultrasonic sensors, such as local control, complex demodulation, and digital filtering to generate output digital samples (e.g., in-phase and quadrature samples). Although a variety of ultrasonic sensor 146 types may be utilized, in an embodiment the ultrasonic sensor may be a piezoelectric micromachined ultrasonic transducer ("PMUT") sensor including a membrane composed of a variety of layers including a piezoelectric layer located between respective electrode layers. In response to a particular electrical signal pattern delivered to the electrode layers (e.g., having a particular amplitude, frequency, waveform, pattern, etc.), the piezoelectric layer (or portions thereof) exhibits a mechanical response that results in the transmission of an acoustic signal that in turn is based on the electrical stimulus. This ultrasonic signal is transmitted into a region of interest for a period of time, for example, based on a location of the ultrasonic sensor within an end-use object detection system 100. The acoustic signal is reflected based on physical objects and/or acoustic interference within the region of interest, resulting in reflections (e.g., an "echo" signal) being returned to the ultrasonic sensor 146. These are received by the piezoelectric layer (or portions thereof) as an acoustic (e.g., mechanical) signal that in turn is converted to an electrical signal based on the characteristics of the acoustic signal. The electrical signal is received via the electrodes and provided to the ultrasonic processing circuitry 142 and DSP 140 for further processing. In some embodiments, the receive acoustic signal may be represented as an "amplitude scan" received over a period of time, with the signals received earlier in time being reflected by closer objects and signals received later in time being reflected by objects that are further away, with the amplitude of the reflected signal at a point in time being based on the characteristics of the object (e.g., density, direction of movement, acoustic interference, etc.).

In the exemplary embodiment of FIG. 1, the ultrasonic device 106 operates during a sleep mode (e.g., periodically or according to a predetermined schedule) while other components of the object detection system 100 are not powered or are in a low power mode. In accordance with detection parameters (e.g., thresholds, gain, hysteresis, etc.) for detecting a particular object, movement, or other item or action of interest, the DSP 140 determines whether a triggering event (e.g., a triggering motion, a triggering presence, etc.) has occurred. When the triggering event has occurred, a signal such as an interrupt signal may be sent to other components of the system such as MCU/APU 104, such as via a dedicated interrupt line as depicted in FIG. 1, or via other methods in other embodiments. In an example, a communication interface (e.g., a serial peripheral interface or SPI interface, or other suitable interfaces such as inter-integrated circuit or I$^2$C, a universal asynchronous receiver/transmitter or UART, etc.) is utilized for data communication between components of the ultrasonic device 106 and other system components. The interrupt transmission may itself include data that provides information about the triggering event, while in other instances the communication interface may be used to communicate some or all such information following the at least partial wakeup of the MCU/APU 104.

MCU/APU 104 includes image processing circuitry 120 and ultrasonic processing circuitry 122, which perform the control, analysis, and other processing of the imaging device 108 and the ultrasonic device 106, respectively. Imaging device 108 includes any suitable device for assessing information about the physical status of a region interest, including two-dimensional (e.g., still image, video, infrared, etc.) and three-dimensional (e.g., time-of-flight, lidar, etc.) imaging devices 108. In some embodiments, the imaging device 108 and the ultrasonic sensor 146 may cover a different field of view. For example, the ultrasonic sensor 146 may have a larger field of view than the imaging device, to trigger the imaging device 108 before an object enters the field of view of the imaging device. As described herein, where there is a desired difference in the field of view, updating of parameters may achieve a proper timing of detection within differing fields of view.

Image processing circuitry 120 includes any suitable combination of processing circuitry types and includes image processing and classification circuitry 124 and image capture processing circuitry 126. Image capture processing circuitry 126 provides control and processing for activating the imaging device, controlling the operation thereof, and performing capture of images or image data, as appropriate for a particular type of imaging device 108. The captured image is provided to image classification circuitry 124, which performs operations such as identifying from the captured image particular information such as the presence or motion of an object, classification of objects (e.g., human, animal, other motion, etc.), identification of particular persons, user counts, and the like. In some embodiments, aspects of this processing may be performed utilizing an artificial intelligence coprocessor 110 such as a GPU or TPU, or such processing may be located on local processing of the MCU/APU 104. For example, a coprocessor 110 may provide dedicated parallel processing for prompt classification of image data.

Ultrasonic processing circuitry 122 includes hardware and software for interfacing with, controlling, updating, and operating the ultrasonic device 106. In an embodiment, ultrasonic processing circuitry 122 including a portable device board support package ("BSP") 136, ultrasonic drivers 134, and presence library 132, although other implementations may use different combinations of hardware and software. BSP 136 provides a low-level interface (e.g., bootloader, kernel adaptation, memory control, register interface, etc.) for the ultrasonic device 106, including updates of detection parameters provided to DSP 140 as described herein. Ultrasonic drivers 134 include specific drivers for ultrasonic device 106, which may be updated as necessary to adapt detection parameters as described herein. Presence library 132 includes detection parameters and routines for controlling such parameters, and may dynamically interface with image processing circuitry 120 (e.g., classification circuitry 124) to update the detection parameters used. Based on an outcome as determined by classification circuitry 124, detection parameters may be updated via presence library 132, which in turn are communicated to ultrasonic device 106 to effect the adaptation of the detection parameters.

The MCU/APU 104, imaging device 108, and/or coprocessor 110 require substantially more power to operate than the ultrasonic device 106, and further, one or more of these components may be powered by battery power or a low or intermittent power source (e.g., solar, etc.). Accordingly, such components may only be activated based on an interrupt being received from ultrasonic device 106. Thus, the frequency of activation of such higher consumption battery powered components will depend on the accuracy of the detection function of the ultrasonic device 106.

Accordingly, the results of the image classification, as determined by image processing circuitry 120, may be utilized to update the presence library 132 with modified detection parameters. A false positive occurs when the ultrasonic device 106 sends an interrupt when in fact the object to be detected (e.g., the presence of a person, animal, or other object, and/or motion) is not present. The interrupt wakes the MCU/APU 104 but the image capture and classification operations determine that the object is not present. Detection parameters can be updated such via presence library 132, for example, to decrease the sensitivity of the ultrasonic detection such as by adapting a threshold or gain, or decrease a sensitivity to motion by increasing criteria for a change in consecutive received ultrasonic signals. A false negative occurs when the ultrasonic device 106 fails to send an interrupt when in fact the object to be detected (e.g., the presence of a person, animal, or other object, and/or motion) is present or sends it later in time than it should have (e.g., based on late detection when the object should have been detected earlier). The MCU/APU 104 may wake despite the lack of interrupt (e.g., by other activation method or periodically) and the image capture and classification operations may determine that the object is present. Detection parameters can be updated such via presence library 132, for example, to increase the sensitivity of the ultrasonic detection such as by adapting a threshold or gain, or increase a sensitivity to motion by decreasing criteria for a change in consecutive received ultrasonic signals.

The MCU/APU 104 is in communication with SOC 102, which may include generalized processing for the object detection system 100 such as by a sensor hub 116 (e.g., for communicating with and controlling multiple sensors) and a CPU 112. For example, SOC 102 receives classification outputs from MCU/APU 104 and performs further processing such as communicating data to other devices or activating a user interface. SOC 102 may receive user settings such as sensitivity settings, which in turn may be used to adapt thresholds or other criteria for image classification and/or ultrasonic object detection. For example, SOC 102 (e.g., the CPU 112 of SOC 102) performs SW defined routines for processing of the ultrasonic and image signals, such as magnitude estimation from in-phase and quadrature outputs from the ultrasonic sensor, threshold generation, threshold comparisons, range calculations, amplitude calculations, and presence detection. SOC 102 may receive user feedback on whether a particular classification result is satisfactory, which in turn may be used to adapt thresholds or other criteria for image classification and/or ultrasonic object detection. To the extent that SOC 102 or any portion thereof operates on a battery-powered or other power-limited device or circuit, wakeup may be provided via the ultrasonic device 106.

Figure 2:
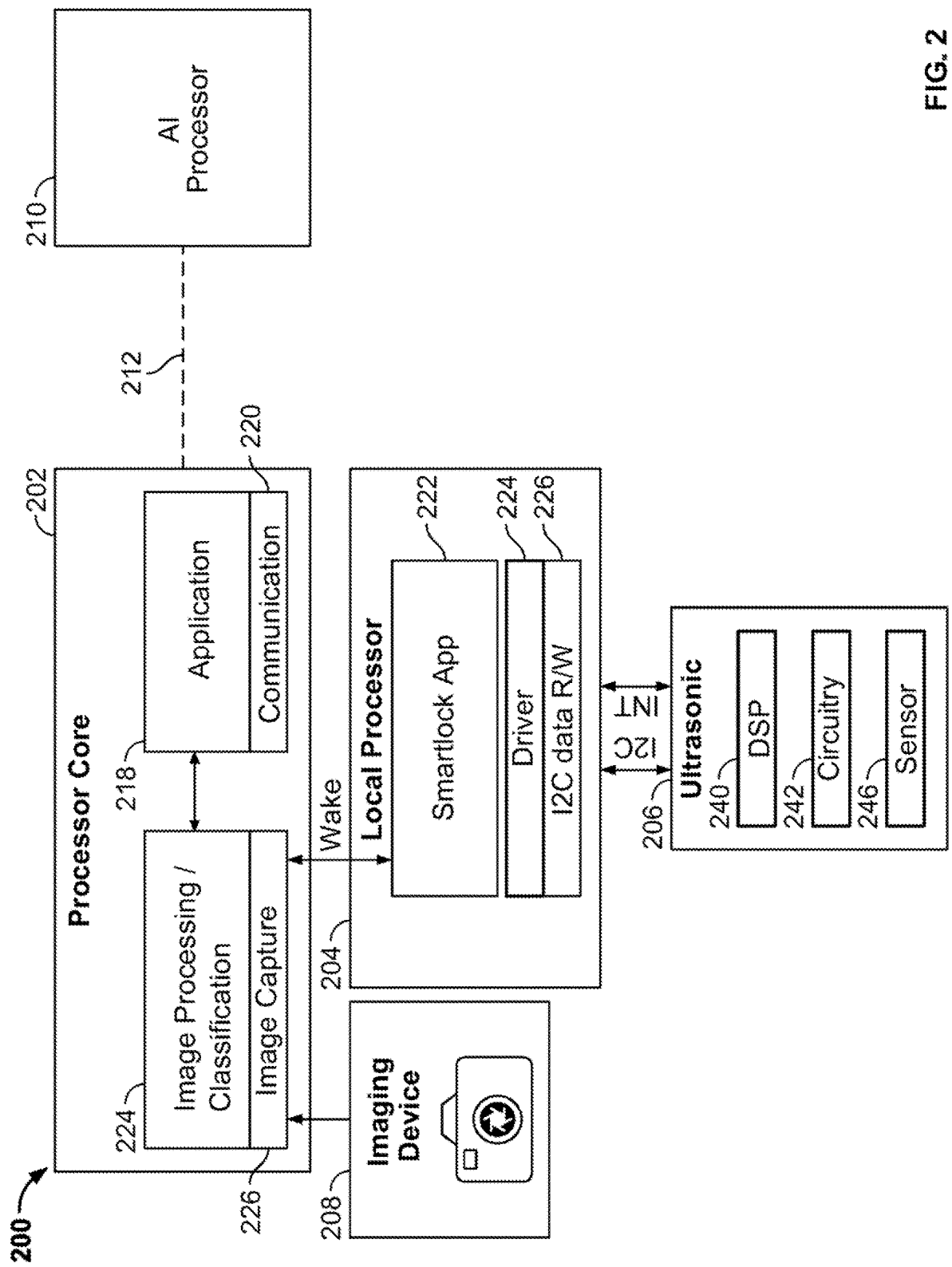
FIG. 2 depicts an illustrative object detection system including an ultrasonic sensor in accordance with another embodiment of the present disclosure.

FIG. 2 depicts an illustrative object detection system 200 including an ultrasonic device 206 in accordance with another embodiment of the present disclosure. More specifically, the example object detection system 200 is directed to an exemplary smartphone wakeup architecture, e.g., where an image capture device 208, e.g., a camera, is employed for capturing image data associated with an entrance to a home, office, or other building or enclosure. Although FIGS. 1 and 2 provide two example architectures for an ultrasonic sensor integrated with image capture devices for object detection, it will be understand that other hardware and software architectures may be utilized in accordance with the present disclosure, so long as the ultrasonic sensor has detection parameters that may be modified in accordance with an analysis of confirmatory data (e.g., from image capture). Although particular components are depicted and described in FIG. 2, it will be understood that components may be added, removed, substituted, or modified in accordance with the present disclosure. For example, while the description of FIG. 2 is described in the context of subsystems of a computing system, depending on implementations some or all of the components may be split between multiple local and remote computing devices, such as respective computing devices, servers, remote sensors, and the like.

In an embodiment of the present disclosure, the object detection system 200 includes a processor core 202, local processor 204, ultrasonic device 206, imaging device 208, and AI processor 210, each of which may include one or more sub-components. Although each of these components and sub-components may be depicted as a logically and/or physically separate unit in FIG. 2, it will be understood that functionality and/or components of one or more of the objection detection system 200 components may be combined with one or more other components or implemented in whole or in part in another component of the object detection system 200. Each of the components of the of the object detection system 200 may include processing circuitry and/or memory as useful to perform the operations and processing described herein. As described herein, at least a low power portion of the object detection system (e.g., including ultrasonic device 206 and local processor 204) may be operational and powered more frequently than other components, for example, to perform an initial evaluation of whether a triggering event has occurred. Ultrasonic device 206 (e.g., including DSP 240 similar to DSP 140, ultrasonic processing circuitry 242 similar to ultrasonic processing circuitry 142, and an ultrasonic sensor 246 similar to ultrasonic sensor 146) may wake according to a first more frequent pattern, with local processor 204 waking based on an interrupt signal from the ultrasonic device 206 and determining whether to wake up additional components such as processor core 202 and imaging device 208. In an example, all components of object detection system 200 except a remotely located AI processor 210 (e.g., connected via a wireless connection 212) may be powered by a local or low-power source, such as one or more batteries (not depicted).

When the triggering event for the ultrasonic device 206 has occurred, a signal such as an interrupt signal may be sent to other components of the system such as local processor 204, such as via a dedicated interrupt line as depicted in FIG. 2, or via other methods in other embodiments. In an example, a communication interface (e.g., I$^2$C interface) is utilized for data communication between components of the ultrasonic device 206 and the local processor 204. The interrupt transmission may itself include data that provides information about the triggering event, while in other instances the communication interface may be used to communicate some or all such information following the at least partial wakeup of the local processor 204.

In an embodiment, the local processor 204 includes a smartlock application 222, an ultrasonic driver 224, and local communication circuitry 226 (e.g., I$^2$C data read/write circuitry). Local communication circuitry 226 provides for communication between the smartlock application 222 (via commands available from driver 224) and ultrasonic device 206 for receiving ultrasonic sensor data and providing control information such as updated detection parameters to the ultrasonic device 206 (e.g., to DSP 240). Smartlock application 222 determines, based on an interrupt and/or ultrasonic sensor data, whether to wake the processor core 202 and related components such as imaging device 208. Additionally, as described herein, smartlock application 222 may provide updated detection parameters to ultrasonic device 206 based on false positives or false negatives identified by the processor core 202 and/or AI processor 210.

Although processor core 202 may include a variety of processing circuitry in different embodiments, in an embodiment image processing and classification circuitry 224 (e.g., similar to image processing and classification circuitry 124), image capture processing circuitry 226 (e.g., similar to image capture processing circuitry 126), application processing circuitry 218, and communication circuitry 220. Image capture processing circuitry 226 and image processing and classification circuitry may operate and process image data from imaging device 208 as described herein (e.g., including communicating with AI processor 210), including performing object detection and communicating the occurrence of false positive and false negative determinations by the ultrasonic device 206 and smartlock application 222, including adaptations to detection parameters for the ultrasonic device 206 or information utilized by the smartlock application 222 and/or ultrasonic device 206 to adapt detection parameters.

Application processing circuitry 218 operates the smartlock such as by controlling user interfaces and automated components such as locking mechanisms (not depicted). For example, the ultrasonic device 206 may wake the processor core 202 and image capture device 208 (e.g., via local processor 204) and the application processing circuitry may determine, based on a classification performed by image processing and classification circuitry 224, that a particular criteria is met. For example, if an authorized user is present without any other individuals (e.g., based on facial recognition) the lock may be opened automatically, while if another individual is present or the authorized user is not present, a local (e.g., a keypad) or remote user interface (e.g., on a smartphone application) may be activated to provide approval and opening of the lock.

Figure 3A:
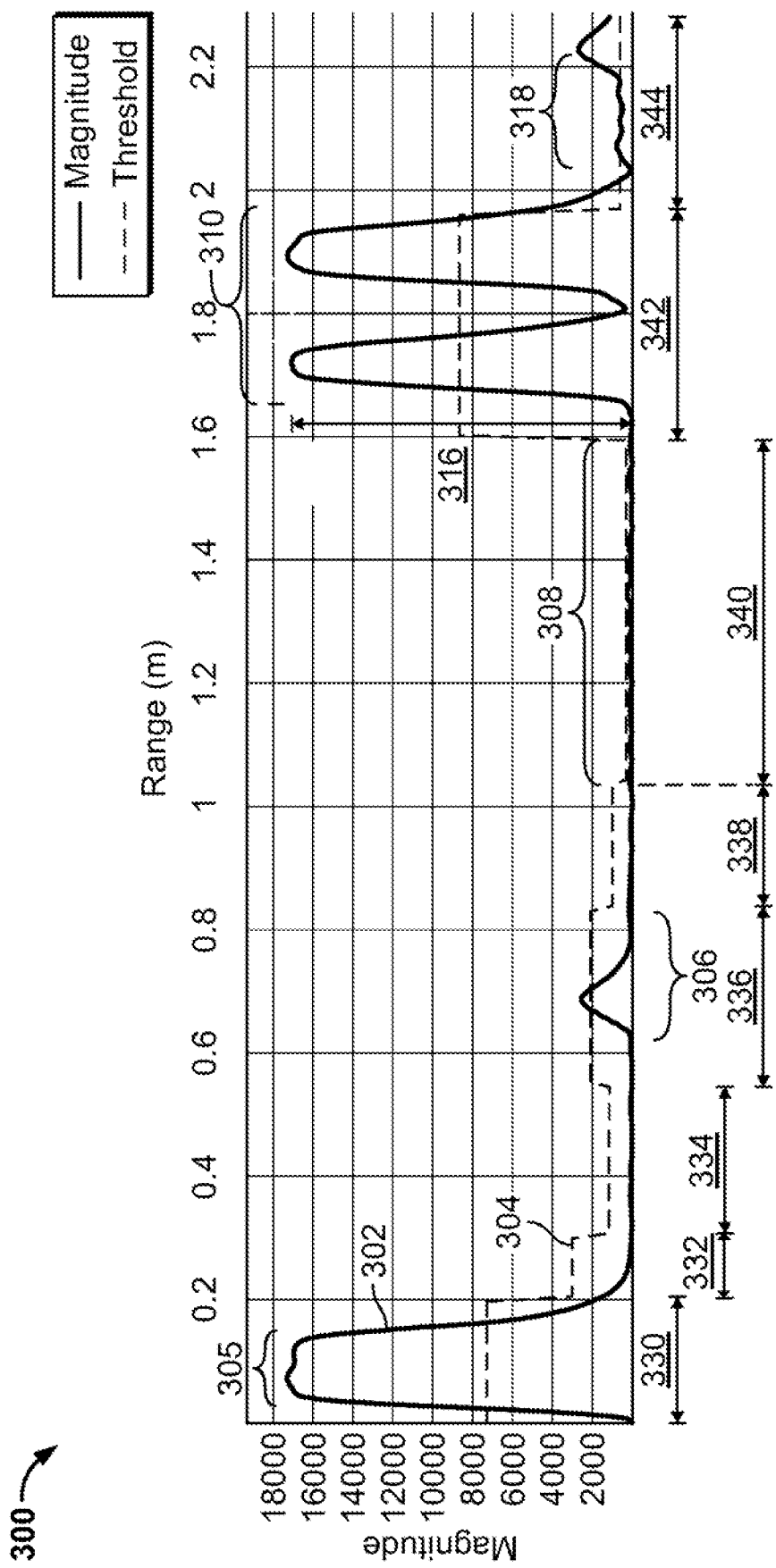
FIG. 3A depicts an exemplary plot of ultrasonic reflections and associated detection thresholds in accordance with an embodiment of the present disclosure.

FIG. 3A depicts an exemplary plot of ultrasonic reflections and associated detection thresholds in accordance with an embodiment of the present disclosure. In an example, the plot 300 is an amplitude scan representing reflected signals of an ultrasonic sensor 146 or 246, e.g., of ultrasonic device 106 or 206, respectively. Accordingly, in the plot 300 a signal 302 having an amplitude is plotted against distance from an ultrasonic sensor, e.g., of ultrasonic device 106 or 206. Reflections of a transmitted ultrasonic signal, e.g., generated by ultrasonic device 106, may be received within a plurality of ranges based on a distance of sources of the reflections from the ultrasonic device 106. The reflections may have a magnitude based on the sources of the reflections. A dynamic threshold 304 is configured based on a particular application (e.g., by DSP 140 or 240, as controlled by other processing circuitry), for example, based on relevant distances where object detection is to occur and known sources of interference. In the embodiments depicted in FIGS. 3A-3E, different ranges (e.g., distances) have different thresholds, including range 330, 332, 334, 336, 338, 340, 342, and 344. In some embodiments, exceeding or falling below a threshold may trigger a wakeup, while in other embodiments the ultrasonic signal 302 may be averaged within a range for comparison, or multiple thresholds may need to be satisfied (e.g., within multiple ranges) for a wakeup to be triggered.

In the exemplary embodiments depicted in FIGS. 3A-3E, a variety of signal features are depicted, including signal feature 305 (e.g., a relatively high magnitude reflection), signal feature 306 (e.g., a recognizable but lower magnitude reflection), signal feature 308 (e.g., a low magnitude periodic reflection), signal feature 310 (e.g., two similar higher magnitude reflections), and signal feature 318 (e.g., a periodic and increasing magnitude reflection). In accordance with embodiments of the present disclosure, the ultrasonic device may trigger a wakeup of the image capture device and associated circuitry due to a trigger event based on comparisons of one or more of the signal features with the respective dynamic thresholds within corresponding ranges. If the image capture system determines that the wake up was unnecessary, e.g., a false positive, actions may be performed to adjust the signal features or the dynamic thresholds to identify the trigger event more accurately, such as by decreasing sensitivity. In some embodiments, the ultrasonic device may trigger a wakeup of the image capture device and associated circuitry due to the lack of a trigger event, for example, to turn off a screen due to inactivity. If the image capture system determines that the wake up was missed or late, e.g., a false negative, actions may be performed to adjust the signal features or the dynamic thresholds to identify the trigger event more accurately, such as by increasing sensitivity.

As will be described further below, adaptations may be made to detection parameters in one or more ranges to correct for errors such as a false positive or false negative determination. Adaptations may include adjustments to a signal 302 in one or more ranges to a threshold 304 in one or more ranges. In this manner, sensitivity may be adjusted in a desired range to mitigate false positive errors and/or false negative errors. Accordingly, adjustments or adaptations may be made to any one or more of a magnitude of threshold 304 in one or more of the ranges, a gain applied to the reflections/signal 302 within one or more of the ranges, a width of one or more of the ranges, a rate of change or a hysteresis within one or more of the ranges, or a gain of the transmitted ultrasonic signal. Additionally, as will be seen below in specific examples, adaptations may be made to multiple different ranges in the plot 300, such that a first adaptation is applied within a first range, while a different adaptation is applied within a second range of the plurality of ranges. Accordingly, detection parameters corresponding to different ranges may be adjusted independently of one another. Merely as one example, in a first range sensitivity may be increased while a sensitivity may be decreased in another range. In another example, different types of object detection parameters may be adjusted in different ranges. For example, in a first range one of a sense magnitude threshold, a gain associated with a portion of the reflection/signal 302, or a gain of the transmitted ultrasonic signal used to generate the reflected signal 302 may be modified, while in another range a different one of the sense magnitude threshold, reflection/signal gain, or gain of the transmitted ultrasonic signal is modified.

Merely by way of example, a tree branch may be located in the range 342, 1.6-2.0 meters from the ultrasonic sensor in a doorbell system. Generally, an array of thresholds may be used for detection in corresponding ranges of the plot 300. Accordingly, the threshold 304 may be relatively higher in a first range 330 than in another of the ranges 334. Different thresholds may be selected based upon characteristics of the different ranges. For example, an obscuring object may be present in the range 330 rendering detection of movement/a human more difficult. Accordingly, an array of sensitivities may be used, e.g., such that threshold 304 is different in different ranges of the plot 300. It should be understood that a sensitivity is inversely proportional to a threshold, and as such where the threshold 304 is relatively higher, sensitivity may be said to be proportionally lower. As a result, adaptation to detection parameter(s) may comprise changing a sensitivity by an amount proportional to an inverse of a magnitude within a relevant range of the plurality of ranges corresponding to the triggering motion. In an example, a false detection may occur where an object is detected by an ultrasonic device without the object's actual presence.

In the example plot illustrated at FIG. 3A, the signal feature 310 exceeds the threshold 304 in the range 342, however it is determined from image data captured by, for example, imaging device 108 or 208, that no object is actually present. Accordingly, the threshold 304 in the range 342 may be increased (i.e., the sensitivity may be decreased) to reduce the occurrence rate of false positives from that range.

Figure 3B:
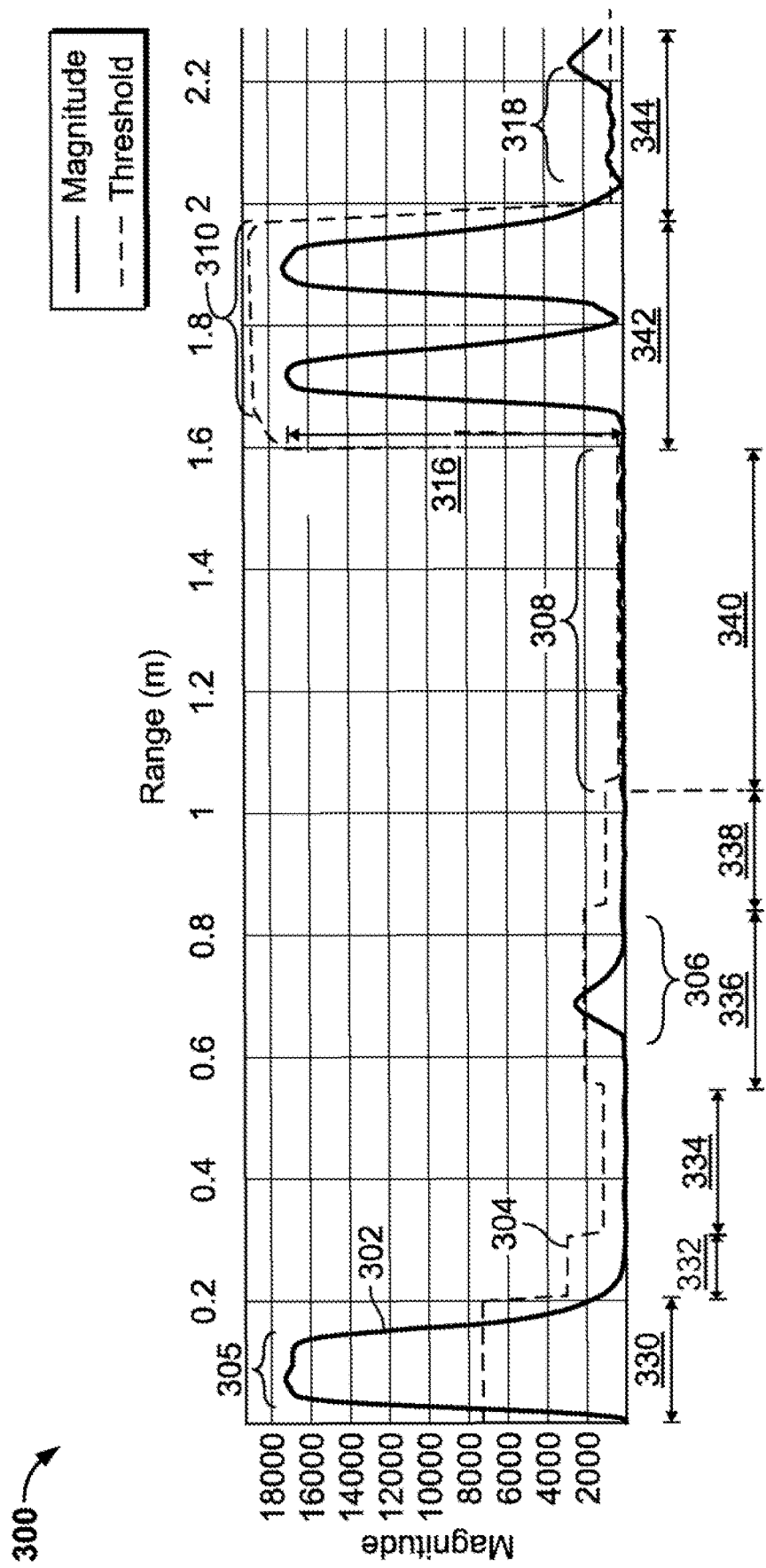
FIG. 3B depicts the exemplary plot of FIG. 3A, illustrating adjustments to a threshold within a range of the ultrasonic reflections, in accordance with an embodiment of the present disclosure.

FIG. 3B depicts the exemplary plot of FIG. 3A, illustrating adjustments to a threshold within a range of the ultrasonic reflections, in accordance with an embodiment of the present disclosure. As depicted in FIG. 3B, the threshold 304 is increased within the range 342 for signal feature 310, such that the signal feature 310 does not cause a trigger event for a wake up. Within the range 342, the dynamic threshold is increased above the magnitude 316 of the signal feature 310. Accordingly, the plot 300 may be modified to have an increased threshold in range 342, as illustrated in FIG. 3B.

Figure 3C:
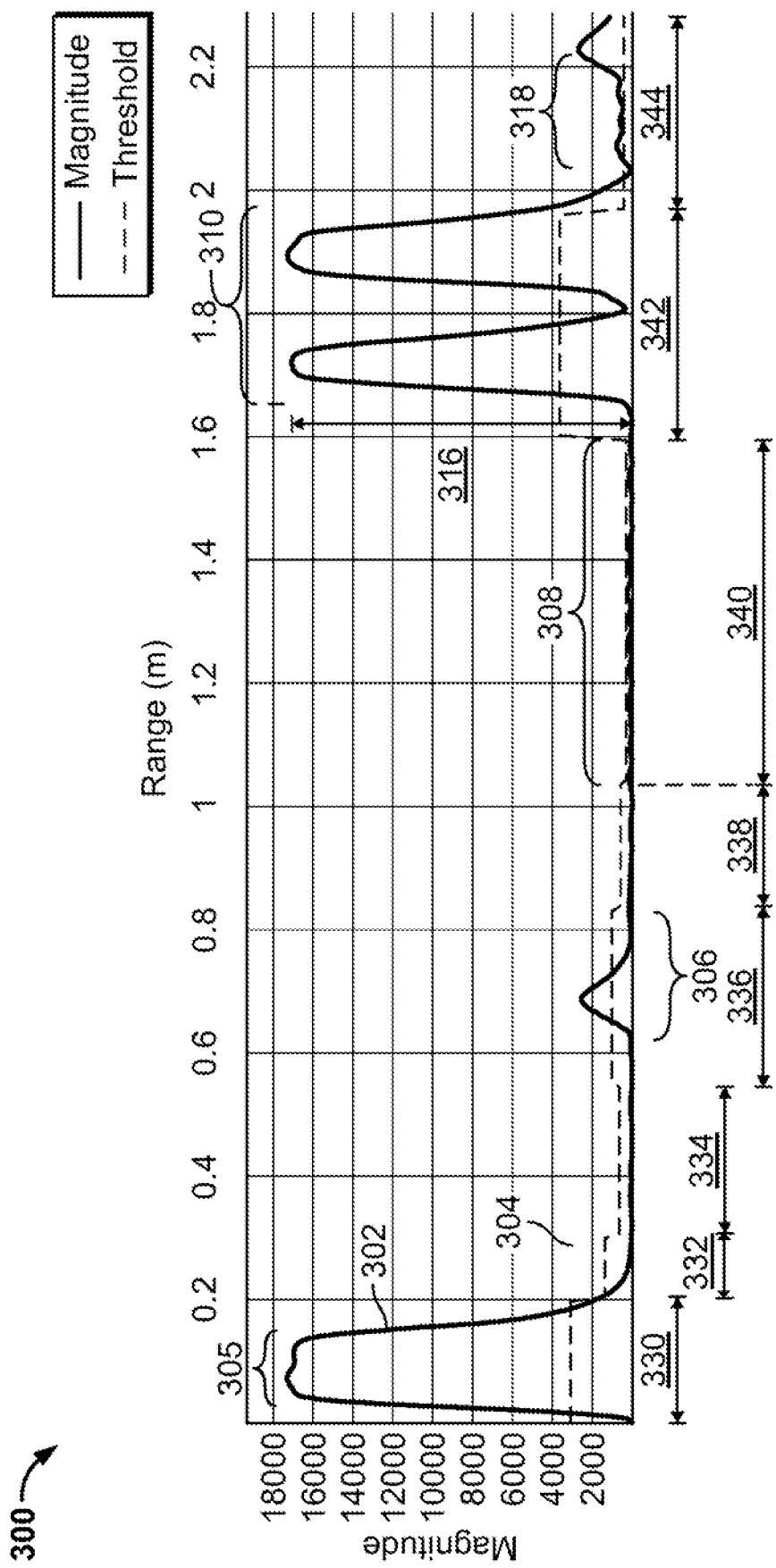
FIG. 3C depicts the exemplary plot of FIG. 3A, illustrating adjustments to a threshold across an entire range of the ultrasonic reflections, in accordance with an embodiment of the present disclosure.

FIG. 3C depicts the exemplary plot of FIG. 3A, illustrating adjustments to a threshold across an entire range of the ultrasonic reflections, in accordance with an embodiment of the present disclosure. For example, instances of false negatives may occur over an entire range of an area of interest, e.g., when a user is not detected by the ultrasonic device 106 while still present as detected by imaging device, or when the ultrasonic sensor does not detect an object when the imaging device and associated processing determine objects of interest are present. As a response, the threshold(s) may be modified in all regions of the signal 302. Accordingly, the threshold 304 may be lowered across all ranges 330, 332, 334, 336, 338, 340, 342, and 344 as illustrated in FIG. 3C. As another example of achieving a similar result, the threshold 304 may be retained (i.e., maintained as illustrated in FIG. 3A) but the transmit signal strength of the ultrasonic sensor may be increased, resulting in increased reflection amplitude over the entire amplitude scan.

Figure 3D:
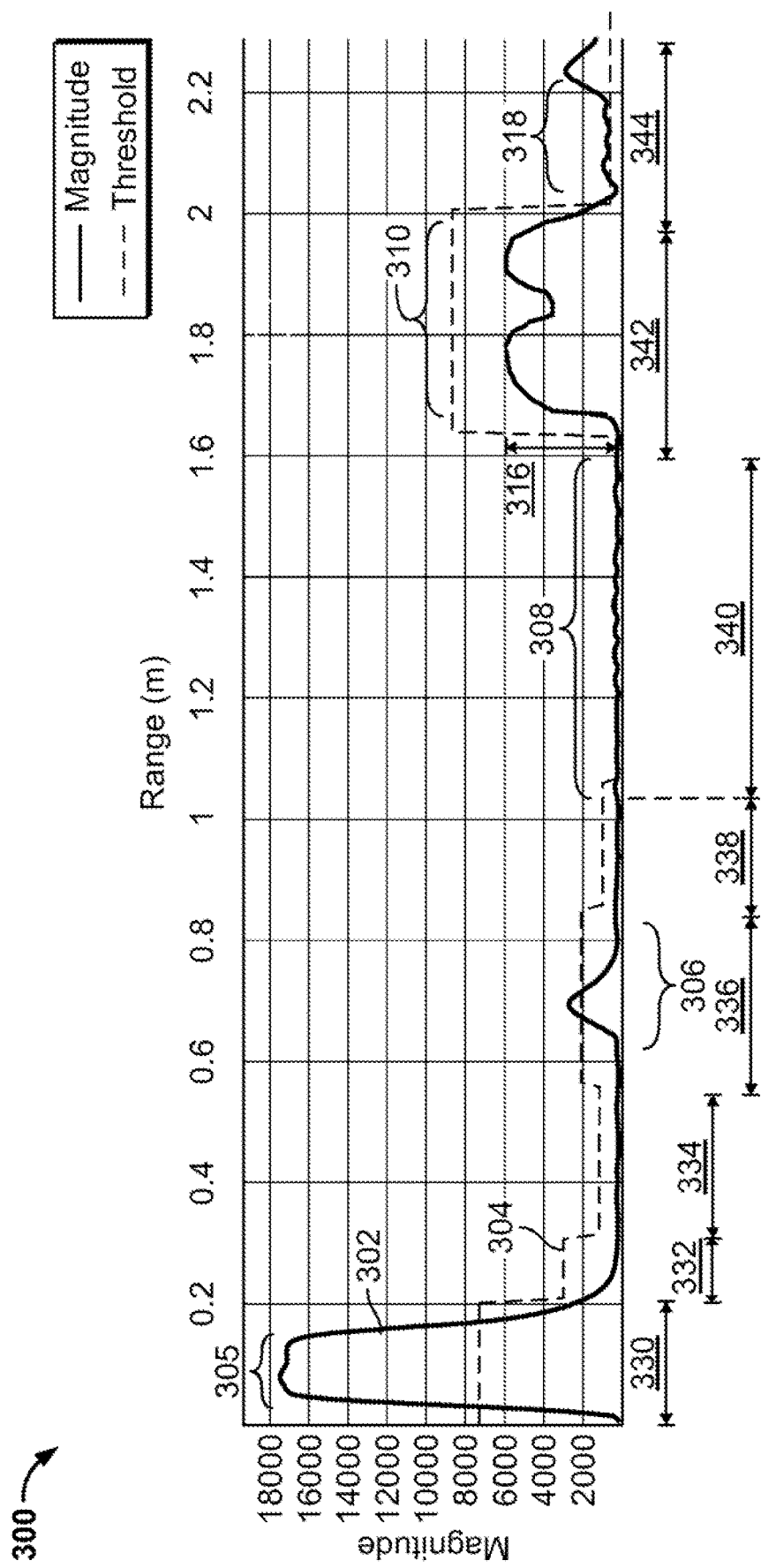
FIG. 3D depicts the exemplary plot of FIG. 3A, illustrating a reduction in a gain within a desired range of the ultrasonic reflections, in accordance with an embodiment of the present disclosure.

FIG. 3D depicts the exemplary plot of FIG. 3A, illustrating a reduction in a gain within a desired range of the ultrasonic reflections, in accordance with an embodiment of the present disclosure. In another example, plot 300 may be modified with adjustments to the sensor receiver gain associated with a particular signal feature, such as signal feature 310 depicted in FIG. 3D. For example, as illustrated in FIG. 3D, when the amplitude of the signal at the range of the false detection discussed above is very large, the receiver gain (i.e., a gain applied to reflections of the signal transmitted by ultrasonic device 106) at that range may be reduced, thereby preventing the detected movement due to signal feature 310 from exceeding the threshold in the range 342.

Figure 3E:
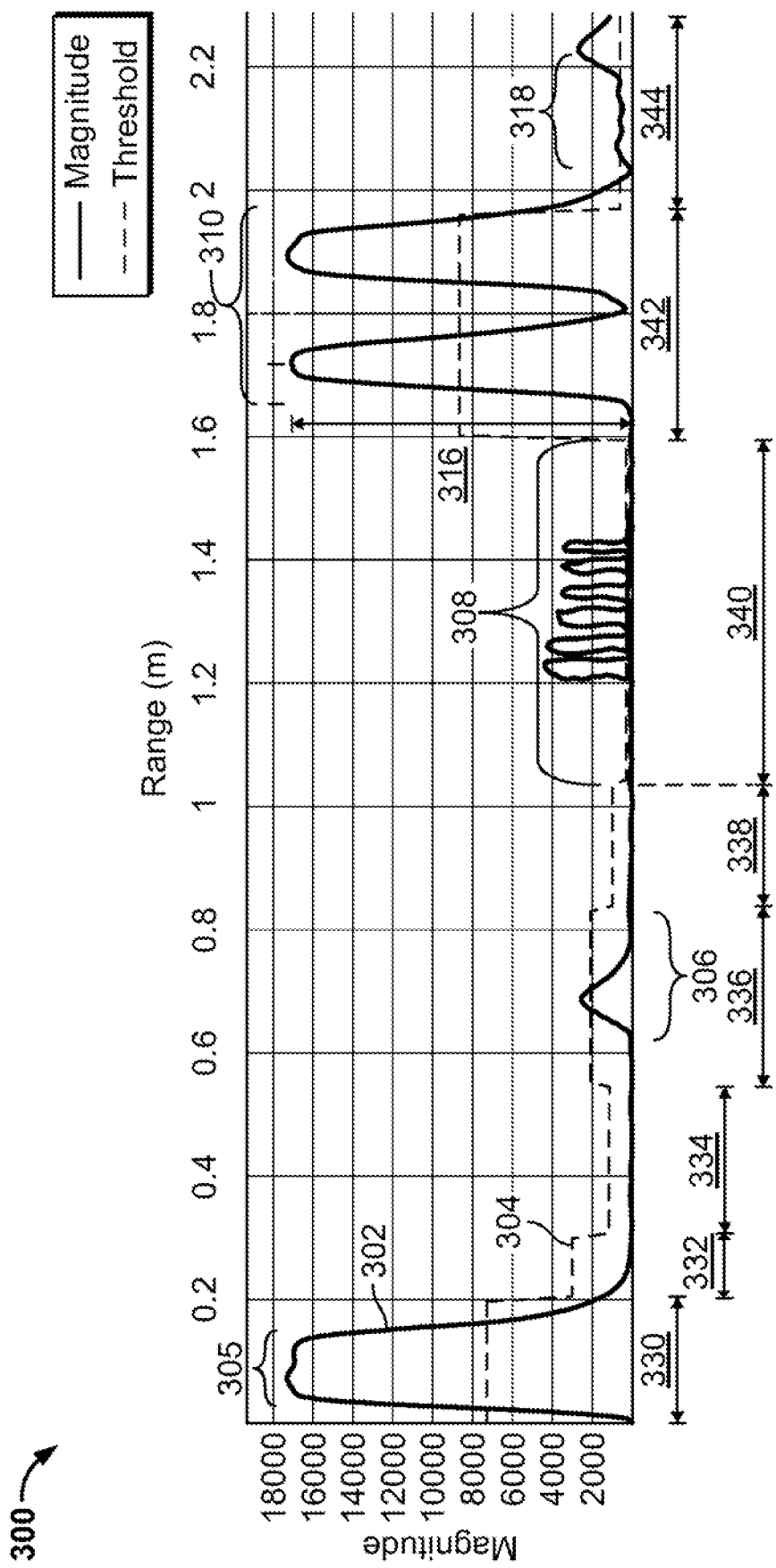
FIG. 3E depicts the exemplary plot of FIG. 3A, illustrating an increase in a gain within a desired range of the ultrasonic reflections, in accordance with an embodiment of the present disclosure.

FIG. 3E depicts the exemplary plot of FIG. 3A, illustrating an increase in a gain within a desired range of the ultrasonic reflections, in accordance with an embodiment of the present disclosure. In another example, plot 300 may be modified to increase sensor receiver gain and transmitter gain, e.g., when the amplitude of the signal 302 is very small across the entire trace or within component ranges of the trace. For example, as illustrated in FIG. 3E, gain is increased for signal feature 308 in the range 340 to increase amplitude or magnitude of the signal feature 308. As an example, a false negative may be identified based on the threshold within range 340 and signal feature 308, while the image analysis determines that a user is in fact present within that range. Accordingly, increasing the gain may compensate for the false negative within the range 340.

Figure 4:
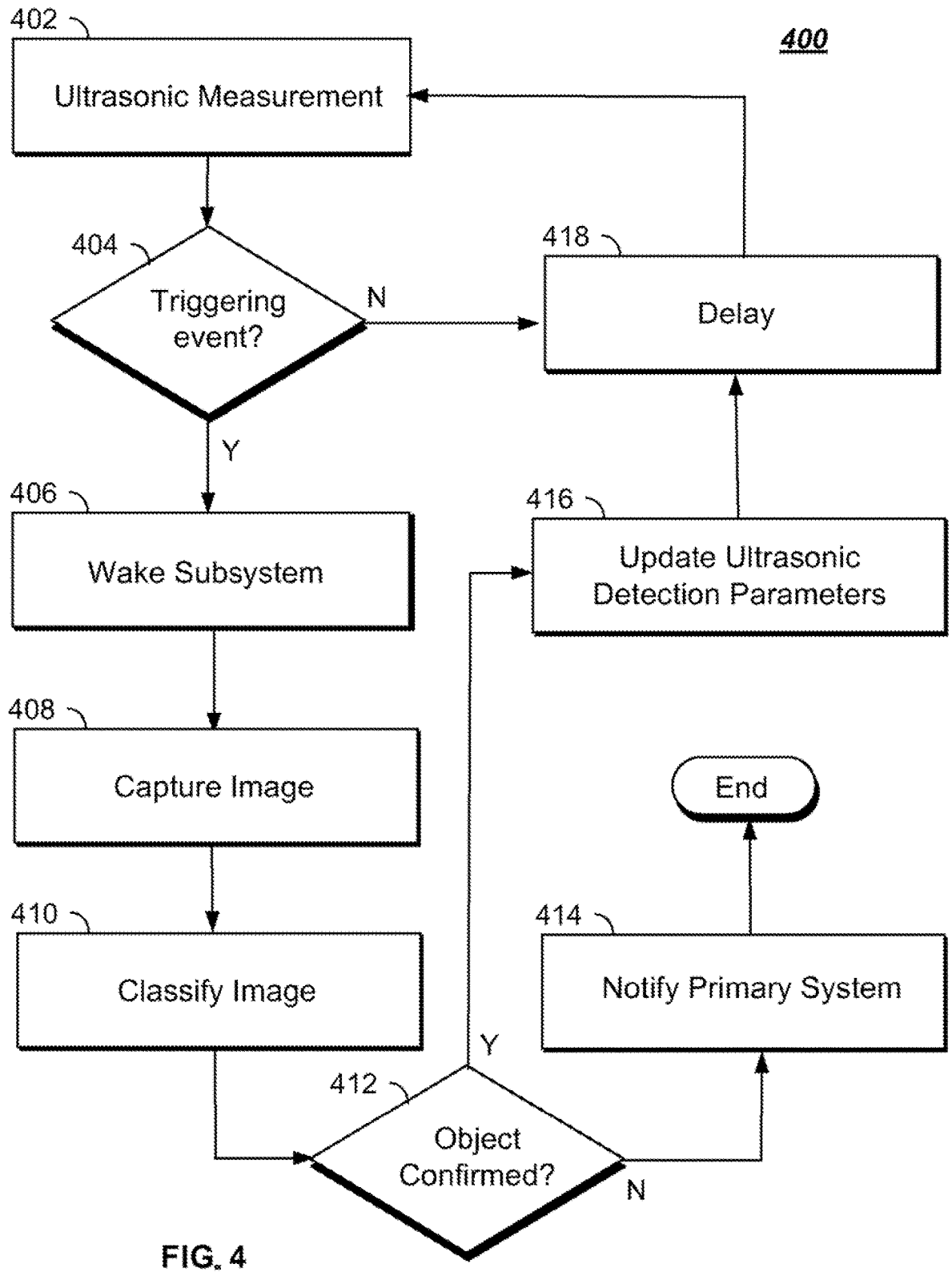
FIG. 4 depicts exemplary steps of determining whether a false positive identification has occurred in accordance with an embodiment of the present disclosure.
Figure 5:
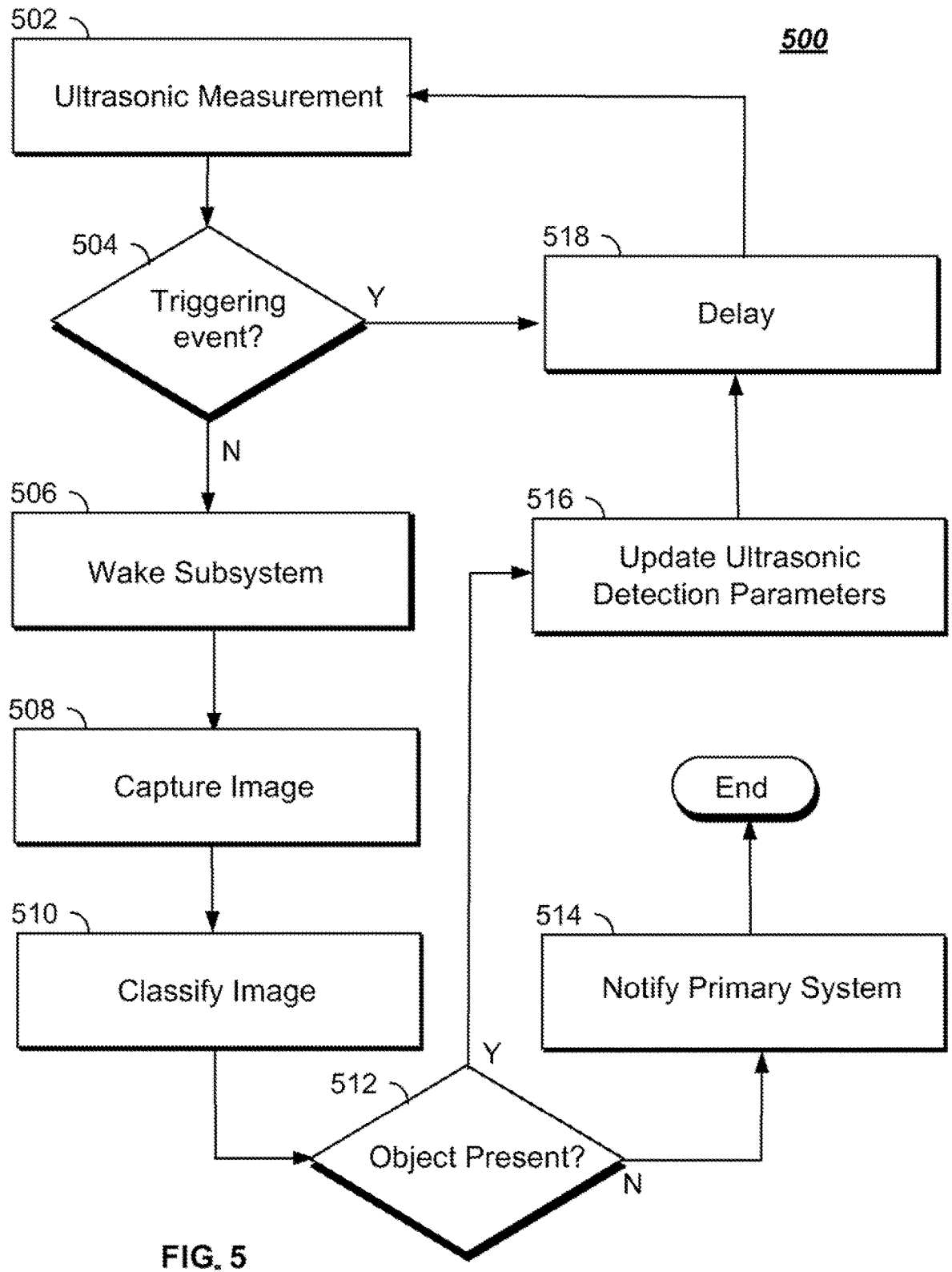
FIG. 5 depicts exemplary steps of determining whether a false negative identification has occurred in accordance with an embodiment of the present disclosure.
Figure 6:
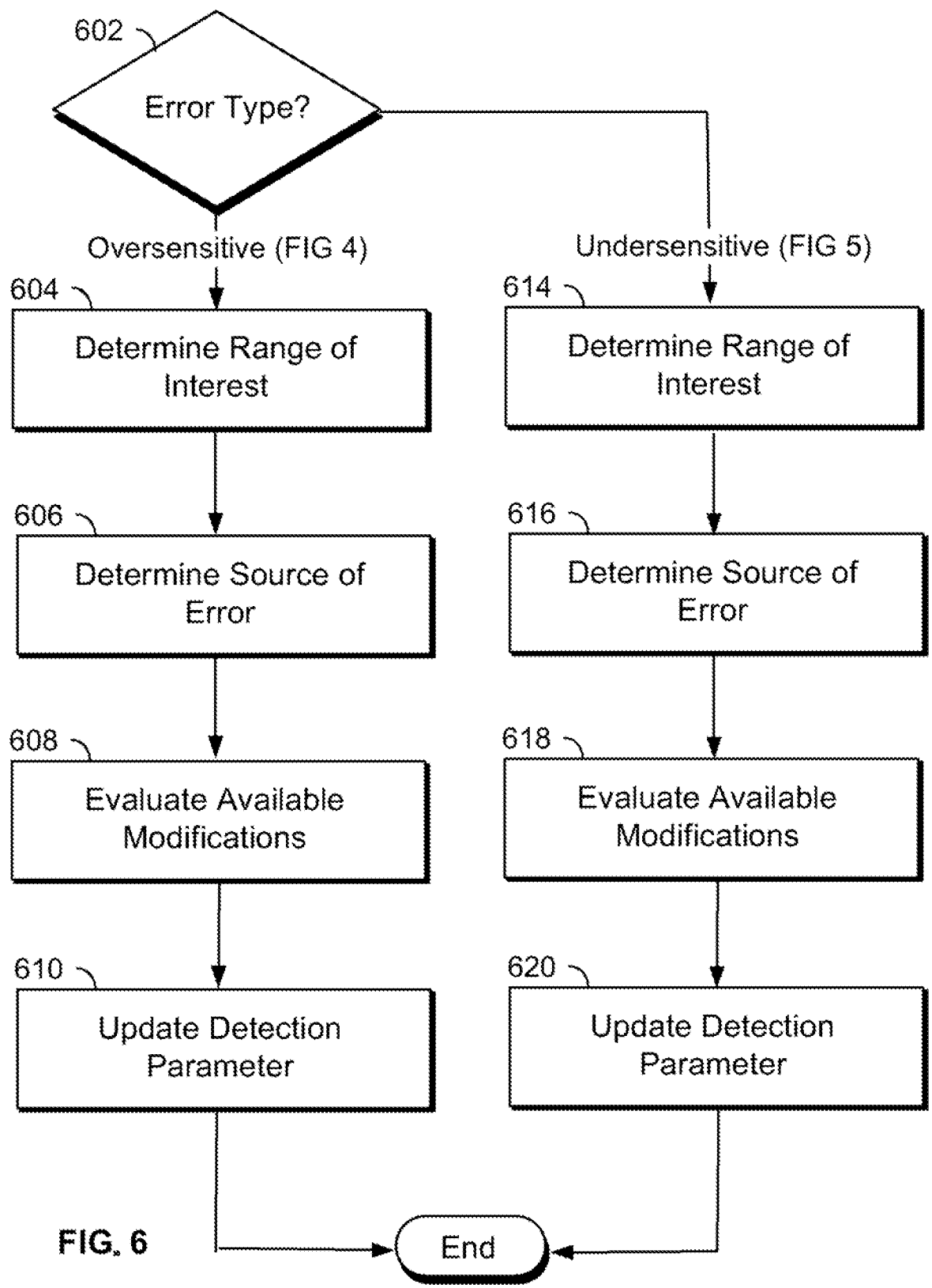
FIG. 6 depicts exemplary steps of adapting ultrasonic detection parameters in response to a false positive or false negative determination in accordance with an embodiment of the present disclosure.

Referring now to FIGS. 4-6, example processes for dynamically adapting ultrasonic detection parameters, e.g., based on image classification, are illustrated and described in further detail. Although particular steps are depicted in a certain order for FIGS. 4-6, steps may be removed, modified, or substituted, and additional steps may be added in certain embodiments, and in some embodiments, the order of certain steps may be modified.

FIG. 4 depicts exemplary steps of a process 400 for adapting ultrasonic detection parameters, in accordance with an embodiment of the present disclosure. More particularly, process 400 is provided as an example response to a false positive determination, e.g., where an ultrasonic device erroneously determines a motion/presence of a human without the relevant motion or presence of a human having occurred. In the illustrated example, one or more object detection criteria may be adjusted in response to a false positive determination that is made based at least upon the object detection criteria causing the false positive corresponding to a presence of the object. Generally, adaptations in response to a false positive may decrease a sensitivity of the determination that the triggering motion has occurred. As illustrated above in FIGS. 3A-3E, reflections of the transmitted ultrasonic signal may in at least some examples be received within a plurality of ranges based on a distance of sources of the reflections from the ultrasonic sensor and have a magnitude based on the sources of the reflections, e.g., in an amplitude scan of the reflected signal. Accordingly, sensitivity may be decreased within a desired one or more of the ranges corresponding to the triggering motion resulting in the false positive determination.

Processing may begin at block 402, where an ultrasonic device, e.g., ultrasonic device 106 or 206 performs an amplitude scan. For example, ultrasonic sensor 146 or 246 may transmit an ultrasonic signal and may subsequently receive reflections of the transmitted ultrasonic signal. Proceeding to block 404, process 400 may query whether motion has been detected, e.g., based on a triggering event occurring within a particular range of the amplitude scan. For example, processing circuitry may evaluate reflections of the ultrasonic signal transmitted by ultrasonic sensor based on detection parameters such as thresholds, averages, gains, hysteresis, and signal patterns. One type of evaluation may be evaluation of such information bases based on a presence algorithm, for example, as described in U.S. patent application Ser. No. 16/999,179, filed Aug. 21, 2020, and entitled "Detecting Presence of a Moving Object with an Ultrasonic Transducer," which is incorporated by reference herein in its entirety. Process 400 may then determine, based on the evaluating, whether a triggering event, e.g., presence or motion of an object, has occurred.

If no triggering event is determined at block 404, process 400 may proceed to block 418, where a delay is implemented based on, for example, a frequency at which ultrasonic measurement is performed. Process 400 may then proceed back to block 402, where further ultrasonic measurement(s) are taken.

Alternatively, where process 400 determines that a triggering event has occurred at block 404 based on the detection parameters, process 400 may proceed to block 406 where waking of a relevant subsystem (e.g., imaging device and corresponding processing circuitry) is initiated. For example, when the triggering event has occurred based on the ultrasonic detection parameters, process 400 may report the triggering event to processing circuitry of the object detection system. Further, in response to the reporting of the triggering event, the processing circuitry may wake an image capture system of the object detection system.

Proceeding to block 408, process 400 may capture, by the awakened image capture system, one or more images of an object. Process may then proceed to block 410, at which process 400 may classify the one or more images. Proceeding to block 412, process 400 may query whether an object has been confirmed by the awakened image capture system, e.g., to confirm accuracy of the determination of the triggering event at block 404. For example, process 400 may determine, based on the classifying, whether the object satisfies one or more object detection criteria. In the present example, an error occurs in the form of a "false positive" result. More specifically, an error occurs by the ultrasonic detection system determining a triggering event when it is not justified, e.g., an object is determined to be present without the actual presence of the object. Accordingly, in this example process 400 may identify an error in the determination that the triggering event has occurred when the relevant object detection criteria is not satisfied. Process 400 may proceed to block 416, where ultrasonic detection parameter(s) are updated as a response to the error. For example, as noted above various ultrasonic detection parameters such as thresholds, transmit gain, receive gain, hysteresis, signal patterns, and averaging may be adjusted.

Alternatively, where process 400 determines that an object is confirmed, e.g., to confirm accuracy of the determination of the triggering event at block 404, process 400 may proceed to block 414, where the system (e.g., ultrasonic device 106/206) is notified of the confirmation. In some embodiments, such a confirmation may be utilized to increase a confidence associated with the triggering event and corresponding detection parameters.

Referring now to FIG. 5, an example process 500 comprising exemplary steps of adapting ultrasonic detection parameters in response to a false negative determination is illustrated and described in further detail. For example, a false negative error may occur, e.g., where an ultrasonic device erroneously fails to detect an actual presence or motion of a human. In the illustrated example, one or more object detection criteria may be adjusted in response to a false negative determination that is made based at least upon the object detection criteria causing the false negative corresponding to a determined lack of a presence of the object. Generally, adaptations in response to a false negative may increase a sensitivity with respect to sensing a triggering event. As illustrated above in FIGS. 3A-3E, reflections of the transmitted ultrasonic signal may in at least some examples be received within a plurality of ranges based on a distance of sources of the reflections from the ultrasonic sensor and have a magnitude based on the sources of the reflections, e.g., in an amplitude scan of the reflected signal. Accordingly, sensitivity may be increased within a desired one or more of the ranges corresponding to the triggering event resulting in the false negative determination.

A false negative may be detected, for example, when imaging device 108 or other image collection/capture device is detecting a presence/motion of a relevant object, and the ultrasonic device 106 does not detect the same object. In another example, a test or calibration phase may be implemented with respect to an object detection system, in which the primary subsystem such as the imaging device is periodically awakened to collect image data and determine whether the ultrasonic detection parameters require updating. Accordingly, the imaging device may collect image(s) to facilitate detection of the false negative error, even when the triggering motion has not occurred based on the ultrasonic detection parameters.

Processing may begin at block 502, where an ultrasonic device, e.g., ultrasonic device 106 or 206 takes ultrasonic measurement(s). For example, the ultrasonic sensor may transmit an ultrasonic signal and may subsequently receive reflections of the transmitted ultrasonic signal. Proceeding to block 504, process 500 may query whether a triggering event has occurred, e.g., a presence of an object or motion has been detected. For example, processing circuitry may evaluate reflections of the ultrasonic signal transmitted by ultrasonic sensor 146 and/or 246 based on detection parameters. Process 500 may then determine, based on the evaluating, whether a triggering event has occurred. Process 500 may employ ultrasonic detection parameters, e.g., as described above in FIGS. 3A-3E.

If a triggering event is determined at block 504, process 500 may proceed to block 518, where a delay is implemented. Process 500 may then proceed back to block 502, where further ultrasonic measurement(s) are taken. Alternatively, where process 500 determines that a triggering event has not occurred at block 504 based on the detection parameters, process 500 may proceed to blocks 506 and 508, where waking of a relevant subsystem (e.g., an imaging device) may be initiated and where one or more images of an object may be captured, respectively. It should be noted that blocks 506 and 508 may not be necessary in examples where process 500 is initiated in response to an already-awakened imaging device and/or already-collected image data.

Process may then proceed to block 510. At block 510, process 500 may classify, by the processing circuitry, the one or more images. Proceeding to block 512, process 500 may query whether the lack of a triggering event was correctly determined at block 504, e.g., as may be indicated by the presence or motion of an object based upon the image(s) captured by the image capture system. For example, process 500 may determine, based on the classifying, whether the object satisfies one or more object detection criteria.

In the present example of FIG. 5, an error occurs in the form of a "false negative" result. More specifically, an error occurs by the ultrasonic detection system failing to determine an object is present when actually present. Accordingly, in this example process 500 may identify an error in the determination that the triggering motion has occurred, but the object does not satisfy the one or more object detection criteria. Process 500 may proceed to block 516, where ultrasonic detection parameter(s) are updated as a response to the error. For example, as noted above various ultrasonic detection parameters may be adjusted.

Alternatively, where process 500 determines that an object is (correctly) determined to not be present, process 500 may proceed to block 514, where the primary system (e.g., ultrasonic device 106/206) is notified of the confirmation of the lack of a triggering event, e.g., by the lack of an object.

Referring now to FIG. 6, exemplary steps of a process 600 for determining how to adapt ultrasonic detection parameters in response to a false positive or false negative determination are illustrated and described in further detail. Process 600 may begin at block 602, where an error type is queried, e.g., by processing circuitry. For example, a noted above adjustments may be implemented differently in response to oversensitive (i.e., false positive) errors or undersensitive (i.e., false negative) errors.

Where process 600 determines that a relevant error is due to oversensitivity, process 600 proceeds to block 604 where a relevant range(s) of interest is determined. For example, process 600 may determine which ranges are subject to the oversensitivity error. Process 600 may then proceed to block 606, to determine a source of the error. Proceeding to block 608, process 600 may evaluate available adaptations. Merely as examples, process 600 may adjust a threshold, or may adjust a gain of a generated signal or reflected signal, within one or more relevant ranges as described above. Process 600 may then proceed to block 610. At block 610, one or more relevant detection parameter(s) may be updated. Process 600 may then terminate.

Where process 600 determines that a relevant error is due to an undersensitivity (e.g., a false negative error) process 600 proceeds to block 614 where a relevant range(s) of interest is determined. For example, process 600 may determine which ranges are subject to the undersensitivity error. Process 600 may then proceed to block 616, to determine a source of the error. Proceeding to block 618, process 600 may evaluate available adaptations. For example, process 600 may adjust a threshold, or may adjust a gain of a generated signal or reflected signal within one or more relevant ranges as described above. Process 600 may then proceed to block 620. At block 620, one or more relevant detection parameter(s) may be updated. Process 600 may then terminate.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various adaptations, optimizations, and variations may be implemented by a person of ordinary skill in the present art, consistent with the following claims.

What is claimed is:

1. A method of dynamically updating detection parameters for an ultrasonic sensor of an object detection system, comprising:
   transmitting, from the ultrasonic sensor, an ultrasonic signal;
   receiving, at the ultrasonic sensor, reflections of the transmitted ultrasonic signal;
   evaluating the reflections based on the detection parameters;
   determining, based on the evaluating, whether a triggering event has occurred;
   reporting, when the triggering event has occurred, the triggering event to processing circuitry of the object detection system;
   waking, by the processing circuitry in response to the reporting of the triggering event, an image capture system of the object detection system;
   capturing, by the awakened image capture system, one or more images of an object;
   classifying, by the processing circuitry, the one or more images;
   determining, based on the classifying, whether the object satisfies one or more object detection criteria;
   identifying an error in the determination that the triggering event has occurred when the object does not satisfy the one or more object detection criteria; and
   adapting, by the processing circuitry when the error is identified, one or more of the detection parameters.

2. The method of claim 1, wherein the reflections of the transmitted ultrasonic signal are received as an amplitude scan, and wherein the adaptation of the one or more detection parameters comprises adaptation of the one or more detection parameters associated with a first range within the amplitude scan.

3. The method of claim 2, wherein the amplitude scan includes a plurality of ranges, and wherein each range of the plurality of ranges has a different threshold magnitude, and wherein the adaptation of the one or more detection parameters comprises adapting a first threshold magnitude of the first range.

4. The method of claim 2, wherein the adaptation of the one or more detection parameters comprises changing a gain applied to reflections within the first range.

5. The method of claim 2, wherein the adaptation of the one or more detection parameters comprises changing a width of the first range.

6. The method of claim 2, wherein the adaptation of the one or more detection parameters comprises changing a rate of change or a hysteresis within the first range.

7. The method of claim 1, wherein the adaptation of the one or more of the detection parameters comprises changing a gain of the transmitted ultrasonic signal.

8. The method of claim 1, wherein the error comprises a false positive based on the one or more object detection criteria corresponding to a presence of the object, and wherein the adaptation to the one or more detection parameters comprises decreasing a sensitivity of the determination that the triggering event has occurred.

9. The method of claim 8, wherein the reflections of the transmitted ultrasonic signal are received within a plurality of ranges based on a distance of sources of the reflections from the ultrasonic sensor and have a magnitude based on the sources of the reflections, and wherein the sensitivity is decreased within a first range of the plurality of ranges corresponding to the triggering event.

10. The method of claim 1, wherein the error comprises a false negative based on the one or more object detection criteria corresponding to a lack of presence of the object, and wherein the adaptation to the one or more detection parameters comprises increasing a sensitivity of the determination that the triggering event has occurred.

11. The method of claim 10, wherein the reflections of the transmitted ultrasonic signal are received within a plurality of ranges based on a distance of sources of the reflections from the ultrasonic sensor and have a magnitude based on the sources of the reflections, and wherein the sensitivity is increased within a first range of the plurality of ranges corresponding to the triggering event.

12. The method of claim 1, wherein the reflections of the transmitted ultrasonic signal are received within a plurality of ranges based on a distance of sources of the reflections from the ultrasonic sensor and have a magnitude based on the sources of the reflections, and wherein the adaptation to the one or more detection parameters comprises changing a sensitivity of the determination that the triggering event has occurred by an amount proportional to an inverse of the magnitude within a first range of the plurality of ranges corresponding to the triggering event.

13. The method of claim 1, wherein the reflections of the transmitted ultrasonic signal are received within a plurality of ranges based on a distance of sources of the reflections from the ultrasonic sensor and have a magnitude based on the sources of the reflections, wherein the adaptation to the one or more detection parameters comprises applying a first adaptation within a first range of the plurality of ranges and applying a second adaptation within a second range of the plurality of ranges, the second adaptation different from the first adaptation.

14. The method of claim 13, wherein the first adaptation corresponds to an increase in sensitivity and the second adaptation corresponds to a decrease in sensitivity.

15. The method of claim 13, wherein the first adaptation corresponds to changing a first detection parameter of the one or more detection parameters and the second adaptation corresponds to a second detection parameter of the one or more detection parameters.

16. The method of claim 13, wherein each of the first adaptation and the second adaptation comprise a different one of (1) adapting a sense magnitude threshold, (2) adapting a first gain associated with a portion of the reflections, or (3) adapting a second gain of the transmitted ultrasonic signal.

17. The method of claim 1, wherein the evaluation is based on a presence algorithm and the triggering event comprises a presence of an object.

18. The method of claim 1, wherein the adaption of the one or more detection parameters achieves a desired difference in field of view between the ultrasonic sensor and the image capture system.

19. An object detection system, comprising:
   an ultrasonic sensor;
   an image capture system; and
   processing circuitry configured to dynamically update detection parameters for the ultrasonic sensor by:
      transmitting, from the ultrasonic sensor, an ultrasonic signal;
      receiving, at the ultrasonic sensor, reflections of the transmitted ultrasonic signal;

evaluating the reflections based on the detection parameters;
determining, based on the evaluating, whether a triggering event has occurred;
reporting, when the triggering event has occurred, the triggering event to the processing circuitry;
waking, by the processing circuitry in response to the reporting of the triggering event, the image capture system;
capturing, by the awakened image capture system, one or more images of an object;
classifying, by the processing circuitry, the one or more images;
determining, based on the classifying, whether the object satisfies one or more object detection criteria;
identifying an error in the determination that the triggering event has occurred when the object does not satisfy the one or more object detection criteria; and
adapting, by the processing circuitry when the error is identified, one or more of the detection parameters.

20. The object detection system of claim 19, wherein the reflections of the transmitted ultrasonic signal are received as an amplitude scan, and wherein the adaptation of the one or more detection parameters comprises adaptation of the one or more detection parameters associated with a first range within the amplitude scan.

21. The object detection system of claim 20, wherein the adaptation of the one or more detection parameters comprises one or more of:
adapting a first threshold magnitude of the first range;
changing a reflection gain applied to reflections within the first range;
changing a width of the first range;
changing a rate of change or a hysteresis within the first range; or
changing a transmission gain of the transmitted ultrasonic signal.

22. A non-transitory computer-readable medium having instructions stored thereon, that when executed by processing circuitry of an object detection system causes the processing circuitry to perform operations comprising:
transmitting, from an ultrasonic sensor, an ultrasonic signal;
receiving, at the ultrasonic sensor, reflections of the transmitted ultrasonic signal;
evaluating the reflections based on detection parameters;
determining, based on the evaluating, whether a triggering event has occurred;
reporting that the triggering event has occurred;
waking, in response to the reporting of the triggering event, an image capture system of the object detection system;
capturing, by the awakened image capture system, one or more images of an object;
classifying the one or more images;
determining, based on the classifying, whether the object satisfies one or more object detection criteria;
identifying an error in the determination that the triggering event has occurred when the object does not satisfy the one or more object detection criteria; and
adapting, when the error is identified, one or more of the detection parameters.

* * * * *